(12) United States Patent
Bellegarda et al.

(10) Patent No.: US 7,856,479 B2
(45) Date of Patent: *Dec. 21, 2010

(54) METHOD AND APPARATUS FOR FILTERING EMAIL

(75) Inventors: Jerome R. Bellegarda, Los Gatos, CA (US); Devang Naik, San Jose, CA (US); Kim E. A. Silverman, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 573 days.

This patent is subject to a terminal disclaimer.

(21) Appl. No.: 11/643,304

(22) Filed: Dec. 20, 2006

(65) Prior Publication Data

US 2007/0106742 A1   May 10, 2007

Related U.S. Application Data (63) Continuation of application No. 11/431,225, filed on May 9, 2006, which is a continuation of application No. 09/881,986, filed on Jun. 14, 2001, now Pat. No. 7,076,527.

(51) Int. Cl.
*G06F 15/16* (2006.01)
*G06F 17/00* (2006.01)
(52) U.S. Cl. .................... 709/206; 709/207; 706/45
(58) Field of Classification Search ............. 709/206, 709/207; 707/5, 7; 706/45
See application file for complete search history.

(56) References Cited

U.S. PATENT DOCUMENTS

| | | | |
|---|---|---|---|
| 4,885,704 A | 12/1989 | Takagi et al. | |
| 4,945,475 A | 7/1990 | Bruffey et al. | |
| 5,021,976 A | 6/1991 | Wexelblat et al. | |
| 5,060,135 A | 10/1991 | Levine et al. | |
| 5,140,677 A | 8/1992 | Fleming et al. | |
| 5,202,828 A | 4/1993 | Vertelney et al. | |
| 5,241,671 A | 8/1993 | Reed et al. | |
| 5,247,437 A | 9/1993 | Vale et al. | |

(Continued)

FOREIGN PATENT DOCUMENTS

DE    3714172    4/1986

(Continued)

OTHER PUBLICATIONS

"Addition of an Expansion Module to System 7—Further Reinforcement of Human Interface," Nikkei Electronics, Jan. 6, 1992, No. 544, pp. 269-274.

(Continued)

*Primary Examiner*—Peling A Shaw
(74) *Attorney, Agent, or Firm*—Blakely, Sokoloff, Taylor & Zafman LLP (57) ABSTRACT

A method and apparatus for filtering messages comprising determining a first semantic anchor corresponding to a first group of messages, for example, legitimate messages and a second semantic anchor corresponding to a second group of messages, for example, unsolicited messages. Determining a vector corresponding to an incoming message; comparing the vector corresponding to the incoming message with at least one of the first semantic anchor and the second semantic anchor to obtain a first comparison value and a second comparison value; and filtering the incoming message based on the first comparison value and the second comparison value.

35 Claims, 5 Drawing Sheets

U.S. PATENT DOCUMENTS

| | | | |
|---|---|---|---|
| 5,287,448 | A | 2/1994 | Nicol et al. |
| 5,297,249 | A | 3/1994 | Bernstein et al. |
| 5,305,435 | A | 4/1994 | Bronson |
| 5,331,543 | A | 7/1994 | Yajima et al. |
| 5,341,293 | A | 8/1994 | Vertelney et al. |
| 5,347,628 | A | 9/1994 | Brewer et al. |
| 5,349,658 | A | 9/1994 | O'Rourke et al. |
| 5,353,391 | A | 10/1994 | Cohen et al. |
| 5,377,354 | A | 12/1994 | Scannell et al. |
| 5,442,778 | A | 8/1995 | Pedersen et al. |
| 5,442,795 | A | 8/1995 | Levine et al. |
| 5,619,709 | A | 4/1997 | Caid et al. |
| 5,734,916 | A | 3/1998 | Greenfield et al. |
| 5,857,179 | A | 1/1999 | Vaithyanathan et al. |
| 5,987,446 | A | 11/1999 | Corey et al. |
| 6,029,195 | A | 2/2000 | Herz |
| 6,072,942 | A | 6/2000 | Stockwell et al. |
| 6,161,130 | A * | 12/2000 | Horvitz et al. ............... 709/206 |
| 6,192,360 | B1 | 2/2001 | Dumais et al. |
| 6,205,472 | B1 | 3/2001 | Gilmour |
| 6,208,971 | B1 | 3/2001 | Bellegarda et al. |
| 6,243,724 | B1 | 6/2001 | Mander et al. |
| 6,393,460 | B1 | 5/2002 | Gruen |
| 6,460,036 | B1 | 10/2002 | Herz |
| 6,578,025 | B1 * | 6/2003 | Pollack et al. ................. 707/2 |
| 6,613,101 | B2 | 9/2003 | Mander et al. |
| 6,643,686 | B1 | 11/2003 | Hall |
| 6,654,787 | B1 | 11/2003 | Aronson et al. |
| 6,675,162 | B1 | 1/2004 | Russell-Falla et al. |
| 6,701,305 | B1 | 3/2004 | Holt et al. |
| 6,718,368 | B1 | 4/2004 | Ayyadurai |
| 6,807,566 | B1 | 10/2004 | Bates et al. |
| 6,816,885 | B1 | 11/2004 | Raghunandan |
| 7,076,527 | B2 | 7/2006 | Bellegarda et al. |
| 2002/0116463 | A1 | 8/2002 | Hart |
| 2002/0116641 | A1 | 8/2002 | Mastrianni |
| 2002/0129111 | A1 | 9/2002 | Cooper |
| 2002/0169954 | A1 | 11/2002 | Bandini et al. |
| 2003/0041178 | A1 | 2/2003 | Brouk et al. |
| 2007/0106742 | A1 | 5/2007 | Bellegarda et al. |

FOREIGN PATENT DOCUMENTS

| | | |
|---|---|---|
| GB | 2 347 053 | 8/2000 |
| JP | 61-29277 | 12/1986 |
| JP | 63-214831 | 9/1988 |
| JP | 63-228327 | 9/1988 |
| JP | 1-276347 | 11/1989 |
| JP | 02-002458 | 1/1990 |
| JP | 2-158871 | 6/1990 |
| JP | 02-297286 | 12/1990 |
| JP | 02-504439 | 12/1990 |
| JP | 03-172966 | 7/1991 |
| JP | 3-172966 | 7/1991 |
| JP | 3-191467 | 8/1991 |
| JP | 3-232341 | 10/1991 |
| JP | 04-49411 | 2/1992 |
| WO | WO 00/26795 | 5/2000 |

OTHER PUBLICATIONS

"Trend Letter from U.S.A.," Montly ASCII, Aug. 1, 1991, pp. 230-231.

"What is Windows 3.0? Part 1. What Sort of Environment Will it Be?," Monthly ASCII Magazine, ASCII K.K., Mar. 1, 1991, vol. 15, #3, pp. 229-241.

Alwang, Greg "ProntoMail Professional Edition" May 1998.

Bellegarda Jerome R. "Exploiting Latent Semantic Information in Statistical Language Modeling" Proceedings of the IEEE, 88(8) 1279-1296 Aug. 2000.

Bellegarda, Jerome R. et al., "A Novel Word Clustering Algorithm Based on Latent Semantic Analysis." International Conference on Acoustics, Speech, and Signal Proceesing, Conference Proceedings vol. 1 (May 7-10, 1996) pp. 172-175.

Borland, Quattro Pro User's Guide, 1989, p. 229, 235-236, 251-255, 275-286.

Crawford, Elizabeth Automatic Induction of Rules for E-Mail Classification, Proceedings of the Sixth Australian Document Computing Symposium, Coffs Harbour, Australia, Dec. 7, 2001.

Cutting, Douglas et al., "Scatter/Gather: A Cluster-Based Approach to Browsing Large Document Collections," 1992.

Deerwester, et al., "Indexing by Latent Semantic Analysis" 1990.

EP Search Report for EP 0955591, dated Mar. 19, 2004.

Foltz, Peter W. "Using Latent Semantic Indexing for Information Filtering." Proceedings of the Conference on Office Information Systems (1990) pp. 40-47.

Foltz, Peter W. et al., "Personalized Information Delivery: An Analysis of Information Filtering Methods." Communications of ACM, vol. 35, No. 12 (Dec. 1992) pp. 51-60.

Li, et al. "Classification of Text Documents." The Computer Journal vol. 41 No. 8 (1998), pp. 537-546.

Malone, T.W., "How do People Organize Their Desks?, Implications for the Design of Office Information Systems," ACM Transactions on Office Information System, vol. 1, No. 1, Jan. 1983, pp. 99-112.

Mander, Richard et al., "A Pile' Metaphor for Supporting Casual Organization of Information," 1992.

Mander, Richard et al., the specification, claims, abstract, and figures as filed Apr. 30, 1992 assigned U.S. Appl. No. 07/876,921 (now abandoned).

Miller, P. et al., "Business an End-User Oriented Application Development Language," SIG-MOD Record. 12, 1, (Oct. 1981), pp. 38-69.

PCT International Search Report for PCT Application No. PCT/US02/19015 mailed Nov. 26, 2002.

PCT International Search Report for PCT Application No. PCT/US93/02878, mailed Jul. 14, 1993, 4 pages.

Register, Michael et al., "A Hybrid Architecture for Text Classification," 1992.

Sahami, Mehran et al. A Bayesian Approach to Filtering Junk E-Mail. In AAAI-98 Workshop on Learning for Text Categorization, 1998.

Salton, Gerard et al., "Term Weighting in Automatic Text Retrieval," 1987.

Salton, Gerard et al., "Term-Weighting in Automatic Text Retrieval," Information Processing & Management. vol. 24, No. 5, pp. 513-523, 1988.

Segal, Richard et al. MailCat: An Intelligent Assistant for Organizing E-Mail. Proceedings of the Third Internation Conference on Autonomous Agents, pp. 276-282, Seattle, WA 1999.

Shoval et al., "Strategies for Filtering Email Messages Combining Content-Based and Sociological Filtering with User-Stereotypes" 1999.

Tsai et al., "Intelligent Email Management System" 1999.

Furnas, G. et al., "Information Retrieval Using a Singular Value Decomposition Model of Latent Semantic Structure," 1988.

Salton, G. et al., "A Vector Space Model for Automatic Indexing," in: Communications of ACM vol. 18, No. 11, Nov. 1975, pp. 613-620.

Salton, Gerard, "Associative Document Retrieval Techniques Using Bibliographic Information," 1963.

Wong, S. et al., "On Modeling of Information Retrieval Concepts in Vector Spaces," 1987.

* cited by examiner

METHOD AND APPARATUS FOR FILTERING EMAIL

This application is a continuation of co-pending U.S. patent application Ser. No. 11/431,225, filed on May 9, 2006, which is a continuation of U.S. patent application Ser. No. 09/881,986, filed on Jun. 14, 2001, now issued as U.S. Pat. No. 7,076,527.

BACKGROUND OF THE INVENTION

1. Field of the Invention

The present invention relates generally to message filtering. More particularly, this invention relates to email filtering using latent semantic analysis.

2. Copyright Notice/Permission

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in the drawings hereto: Copyright© 2000, Apple Computer, Inc., All Rights Reserved.

3. Background

As the use of computers and the Internet have proliferated, so too has the use of email. Many businesses and consumers use email as a prominent means of communication. Not surprisingly, the exponential growth of the medium has also attracted the interest of commercial email advertisers. Commercial email advertisers obtain email addresses from a variety of sources, for example, from email vendors, or from commercial web sites, often without the permission of the owners of the email addresses. The email addresses may then be used to promote the products and services of the commercial email advertisers, or of the parties they represent.

The result is a deluge of unsolicited email received by hapless email users. One method to deal with unsolicited email is for a user to manually select and delete the unsolicited email. Other methods provide for recognizing a message sent in bulk to multiple recipients, and to either discard or tag the message as a possible unsolicited message. Still other methods maintain a database of addresses of known senders of unsolicited email and on receipt of the email, automatically discard those received from the known senders of unsolicited email. Still other methods use key-word filters. This method provides for scanning the subject and/or the body of the email message for some pre-determined keywords, and if detected, the message may be either discarded or tagged as suspicious.

Despite the methods described above, commercial email advertisers use ingenious methods to frustrate the efforts of email recipients. For example, to defeat the detection of bulk email, the email messages may be routed through a maze of servers so that ultimately, the message does not appear to be a bulk emailing. To defeat the system that tracks the address of known senders of unsolicited messages, the originating address of the unsolicited email may be changed often. To confuse keyword filter methods, the subject field of the email may be deceitfully titled, for example, "In response to your query". Moreover, the key-word filtering method suffers from other significant problems, for example, when trying to filter out email messages from pornographic email advertisers using the word "sex", legitimate anatomical or biological articles that include the word "sex" may also be eliminated.

SUMMARY OF THE INVENTION

A method and apparatus for filtering messages, in particular email messages is described herein. According to one aspect of the present invention, the method comprises determining a first semantic anchor corresponding with a first group of messages, for example, legitimate email messages and a second semantic anchor corresponding with a second group of messages, for example, unsolicited email messages. The method further determines a vector corresponding with an incoming message, compares the vector with at least one of the first semantic anchor and the second semantic anchor to obtain at least one comparison value, and filters the incoming message based on the comparison value.

Embodiments of the invention may be represented as a software product stored on a machine-accessible medium (also referred to as a computer-accessible medium or a processor-accessible medium). According to one aspect of the invention, the machine-accessible medium includes instructions that, when executed by a machine causes the machine to perform operations comprising determining a first semantic anchor corresponding with a first group of messages, for example, legitimate email messages. The machine-accessible medium includes further instructions for determining a second semantic anchor corresponding with a second group of messages, for example, unsolicited email messages. The machine-accessible medium includes further instructions for determining a vector corresponding with an incoming message, compares the vector with at least one of the first semantic anchor and the second semantic anchor to obtain at least one comparison value, and filters the incoming message based on the comparison value.

According to one aspect of the invention, the invention may be represented as an apparatus, e.g. computer system. The computer system comprises a bus, a data storage device coupled to the bus and a processor coupled to the data storage device, said processor to perform a method that comprises determining a first semantic anchor corresponding to a first group of messages. The processor also determines a second semantic anchor corresponding to a second group of messages. The processor further determines a vector corresponding to an incoming message, compares the vector corresponding to the incoming message with at least one of the first semantic anchor and the second semantic anchor to obtain a first comparison value and a second comparison value. The processor filters the incoming message based on the first comparison value and the second comparison value.

BRIEF DESCRIPTION OF THE DRAWINGS

The present invention is illustrated by way of example and not limitation in the figures of the accompanying drawings, in which like references indicate similar elements and in which.

DETAILED DESCRIPTION

Described is a method and apparatus for filtering email using latent semantic analysis.

In the following description, numerous specific details are set forth in order to provide a thorough understanding of the present invention. It will be apparent, however, to one of ordinary skill in the art that the present invention may be practiced without these specific details. In other instances, well-known architectures, steps, and techniques have not been shown to avoid unnecessarily obscuring the present invention.

Parts of the description may be presented using terminology commonly employed by those skilled in the art to convey the substance of their work to others skilled in the art. Also, parts of the description may be presented in terms of operations performed through the execution of programming instructions. As well understood by those skilled in the art, these operations often take the form of electrical, magnetic, or optical signals capable of being stored, transferred, combined, and otherwise manipulated through, for instance, electrical components.

The invention may utilize a distributed computing environment. In a distributed computing environment, program modules may be physically located in different local and remote memory storage devices. Execution of the program modules may occur locally in a stand-alone manner or remotely in a client/server manner. Examples of such distributed computing environments include local area networks, enterprise-wide computer networks, and the global Internet.

In addition, it should be understood that the programs, processes, method, etc. described herein are not related or limited to any particular computer or apparatus nor are they related or limited to any particular communication network architecture. Rather, various types of general purpose machines may be used with program modules constructed in accordance with the teachings described herein. Similarly, it may prove advantageous to construct a specialized apparatus to perform the method steps described herein by way of dedicated computer systems in a specific network architecture with hard-wired logic or programs stored in nonvolatile memory such as read only memory.

Various operations will be described as multiple discrete steps performed in turn in a manner that is helpful in understanding the present invention. However, the order of description should not be construed as to imply that these operations are necessarily performed in the order they are presented, or even order dependent. Lastly, repeated usage of the phrase "in one embodiment" does not necessarily refer to the same embodiment, although it may.

Latent semantic analysis (LSA) is a method that automatically uncovers the salient semantic relationships between words and documents in a given corpus. Discrete words are mapped onto a continuous semantic vector space, in which clustering techniques may be applied. The method for filtering email messages comprises determining a first semantic anchor corresponding with a first group of email messages, for example, legitimate email messages and a second semantic anchor corresponding with a second group of email messages, for example, unsolicited email messages. Determining a vector corresponding with an incoming email message, comparing the vector with at least one of the first semantic anchor and the second semantic anchor to obtain at least one comparison value, and filtering messages based on the comparison value.

Figure 1:
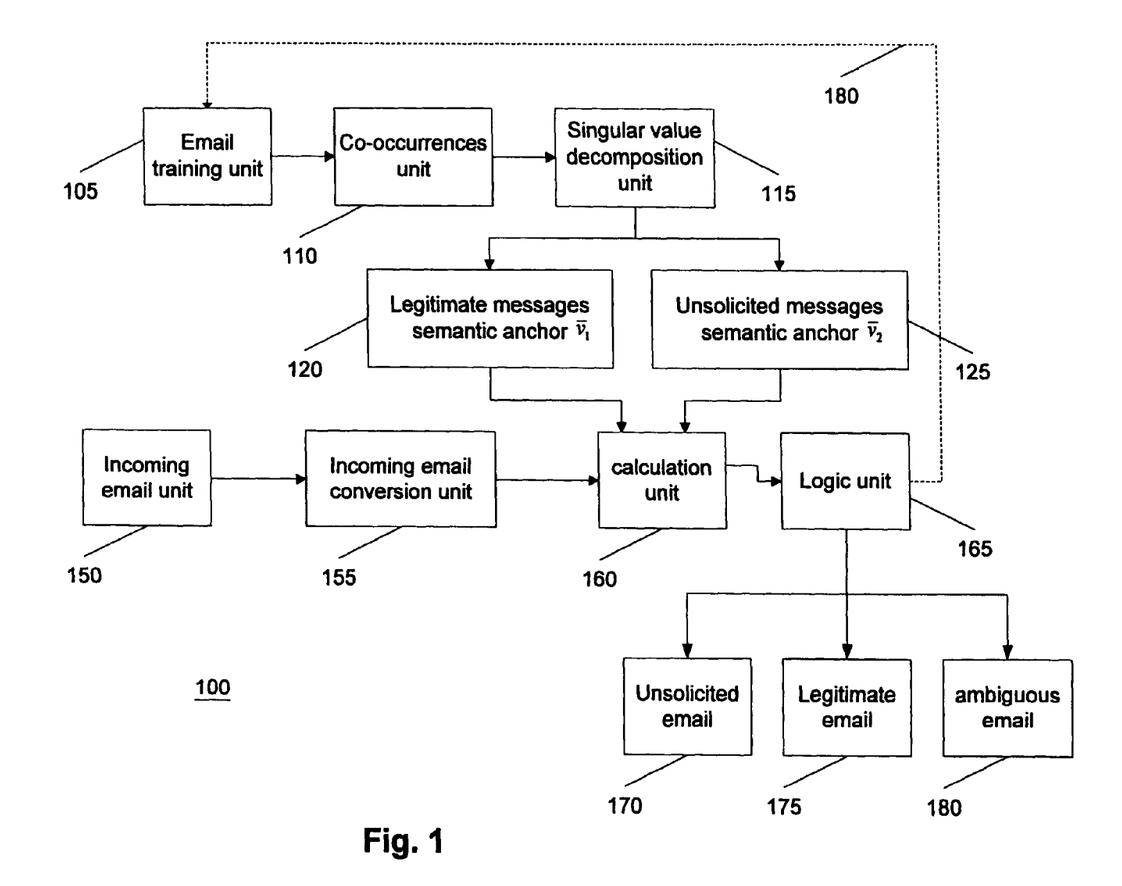
FIG. 1 is a block diagram illustrating an email filtering system according to one embodiment of the present invention.

FIG. 1 is a block diagram illustrating an email filtering system 100 according to one embodiment of the present invention. Although the description that follows describes the filtering of email messages, one skilled in the art will appreciate that the system may be used to filter email attachments, transcribed audio messages, computer programs, e.g., computer viruses, text, and the like. In one embodiment, email filtering system 100 filters unsolicited email messages from legitimate email messages. However, one skilled in the art will appreciate that other embodiments may classify messages into more than two groups.

Email filtering system 100 comprises an email training unit 105 that includes an email training corpus $\mathcal{T}$, for example, a database comprising a collection of $N_1$ legitimate email messages and $N_2$ unsolicited email messages. In one embodiment, the legitimate and unsolicited email messages are obtained from the existing email received by a recipient. Alternate embodiments may allow for a user to manually classify each incoming email message until an adequate email training corpus $\mathcal{T}$ has been established. The words used in the collection of the legitimate email messages, and in the collection of the unsolicited email messages are from some underlying vocabulary v comprising, for example, the M most frequently used words in the language. In one embodiment, M may be ten thousand, and $1 \leq N_1 = N_2 \leq 150$.

Co-occurrences unit 110 of email filtering system 100, comprises a two dimensional (M×2) matrix W formed using the email training corpus $\mathcal{T}$. Matrix W essentially keeps track of which word is found in what document by keeping a record of the number of times each word appears in each legitimate and each unsolicited email message. In particular, entries $\omega_{i,j}$ of matrix W reflects the extent to which each word $\omega_i \in v$ appeared in the legitimate email message (j=1), or in an unsolicited email message (j=2). Various methods may be used to keep a record of the number of occurrences of a word in a document, for example, a simple normalized count of the number of occurrences of each word. However, in one embodiment, co-occurrence unit 110 uses function $$\omega_{i,j} = (1 - \varepsilon_i) \frac{c_{i,j}}{N_j} \quad (1)$$

that normalizes for document length and word entropy to form matrix W. $c_{i,j}$ denotes the number of times each word $\omega_i$ occurs in the collection of legitimate email messages, and the number of times each word $\omega_i$ occurs in the collection of unsolicited email messages. In equation (1) $N_j$, for j=1 and j=2, represents the total number of words in the collection of legitimate email messages, and unsolicited email messages. $\varepsilon_i$ is the normalized entropy of $\omega_i$ in the training email corpus $\mathcal{T}$. $(1-\varepsilon_i)$ is merely a weighting factor, or a word distribution factor, and is a measure of the distribution of a particular word in the email training corpus $\mathcal{T}$. This is explained further below.

In one embodiment, co-occurrences unit 110 calculates $\varepsilon_i$ using equation:

$$\varepsilon_i = -\frac{1}{\log N} \sum_{j=1}^{N} \frac{c_{i,j}}{t_i} \log \frac{c_{i,j}}{t_i} \quad (2)$$

where $N=N_1+N_2$. By definition, $0 \leq \epsilon_i \leq 1$, with equality if and only if $c_{i,j}=t_i$ and $$c_{i,j} = \frac{t_i}{N}.$$

Thus, a value of $\epsilon_i$ close to 1 indicates a word distributed across many email messages throughout the email training corpus $\mathcal{T}$. However, a value of $\epsilon_i$ close to 0 indicates that the word is present only in a few email messages. Thus, the weighting factor is a measure of the distribution of a word across the training email corpus $\mathcal{T}$. In particular, weighting factor $(1-\epsilon_i)$ is a measure of the indexing power of the word $\omega_i$.

After co-occurrences unit 110 constructs matrix W, Singular Value Decomposition (SVD) unit 115 decomposes matrix W, and subsequently obtains the semantic anchors $\bar{v}_1$ and $\bar{v}_2$. The semantic anchors $\bar{v}_1$ 120 and $\bar{v}_2$ 125 are vectors derived from matrix W using SVD. In one embodiment, vectors $\bar{v}_1$ and $\bar{v}_2$ are derived using the following equation:

$$W = USV^T \qquad (3)$$

where U is the (M×2) left singular matrix with row vectors $u_i$ ($1 \leq i \leq M$), S is the (2×2) diagonal matrix of singular values $s1 \geq s2 > 0$, V is the (2×2) right singular matrix with row vectors $v_j$ (j=1,2), and T denotes matrix transposition. Thus, vector $\bar{v}_1$ represents legitimate email messages and vector $\bar{v}_2$ represents unsolicited email messages.

Figure 2:
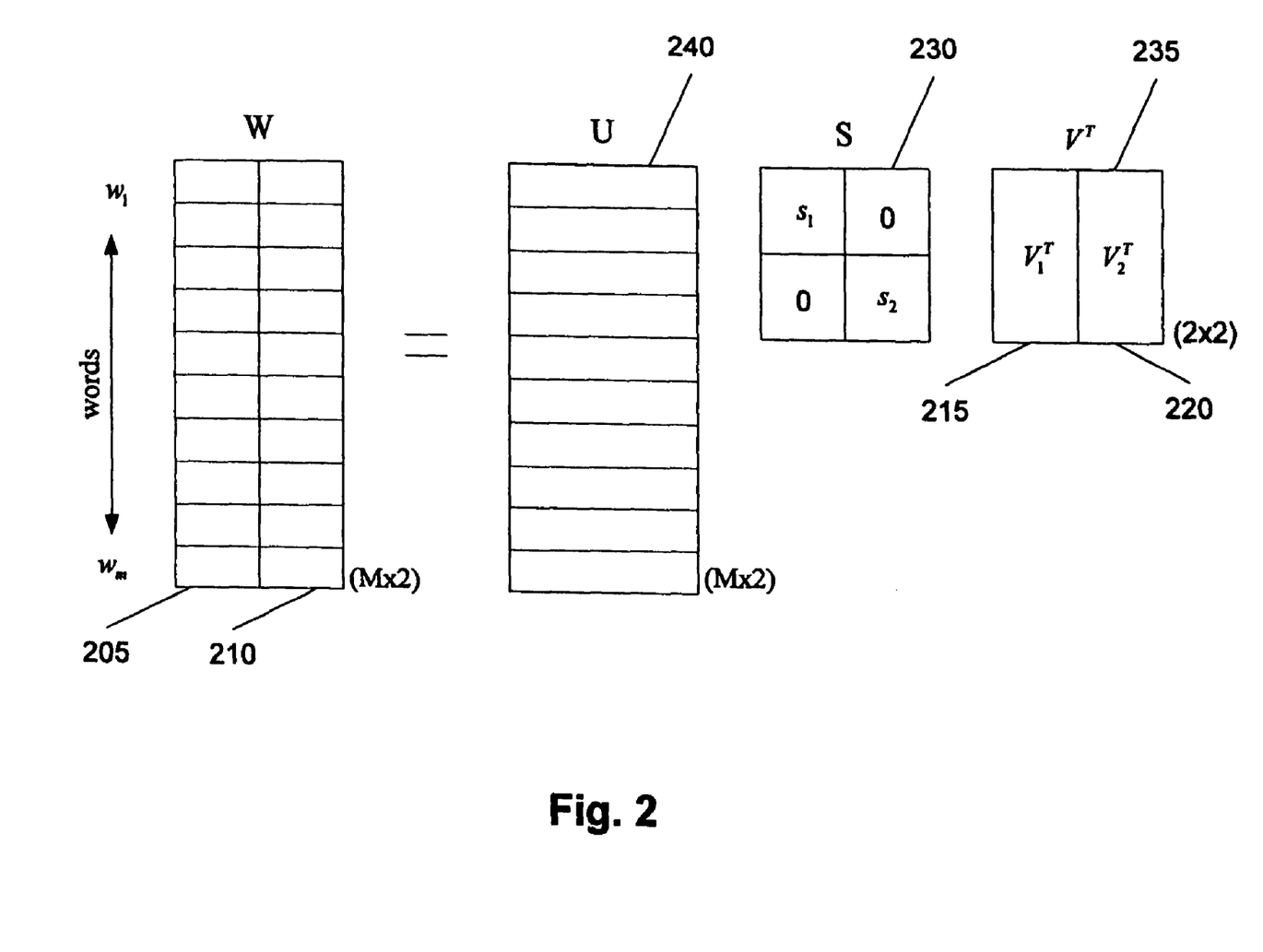
FIG. 2 is a block diagram of the matrices and vectors used in finding semantic anchors.

FIG. 2 is a block diagram of the SVD of matrix W. As FIG. 2 illustrates, the SVD of matrix W defines a mapping between the mathematical representation of the set of legitimate and unsolicited email messages 205 and 210 respectively, and the latent semantic vector space spanned by the singular vectors contained in U and V. The mapping is then scaled by the diagonal matrix 230, to ensure proper representation. From this mapping, the first semantic anchor given by $$\bar{v}_1 = v_1 S \qquad (4)$$

and the second semantic anchor given by $$\bar{v}_2 = v_2 S \qquad (5)$$

are obtained after appropriate scaling by the diagonal matrix S. One skilled in the art will appreciate that $V_1^T$ 215 and $V_2^T$ 220 are unscaled semantic anchors in (2×2) matrix $V^T$ 235, and may be easily converted to 2-dimensional vectors $\bar{v}_1$ and $\bar{v}_2$ using the equations (4) and (5) above. If more than two classification groups are desired, i.e., classification groups other than legitimate and unsolicited, one skilled in the art will appreciate that semantic anchors corresponding to each classification group may be obtained as described above. Matrix U 240 is used to calculate the vector corresponding to an incoming email message as explained below.

Returning to FIG. 1, whenever an incoming email message is received by incoming email unit 150, equation 1 may be used by incoming email conversion unit 155 to convert the incoming email to a column vector $d_3$ of dimension M. In one embodiment, the resulting column vector $d_3$ may be inserted as an additional column in matrix W, thereby converting matrix W of dimension (M×2) into a matrix of dimension (M×3). Using the SVD of equation (2), an unscaled representation $v_3^T$ of the new email message is obtained. Thus, $d_3 = USv_3^T$, and hence the vector representation of the incoming email is obtained as follows:

$$\bar{v}_3 = v_3 S = d_3^T U \qquad (6)$$

The 2-dimensional vector $\bar{v}_3$ of equation (6) is the mathematical representation of the new email message, and can be interpreted as a point in the latent semantic vector space spanned by vectors $\bar{v}_1$ and $\bar{v}_2$.

One skilled in the art will appreciate that equation (6) is an approximate representation of the message in the existing LSA space. Since the new email message was not part of the original SVD extraction, words in the new email message, not found in training corpus $\mathcal{T}$, may cause the SVD expansion to no longer apply. As such, in one embodiment, an optional feed back path 180, as illustrated in FIG. 1, may be used to add the new email message to the training corpus $\mathcal{T}$. Semantic anchors $\bar{v}_1$ and $\bar{v}_2$ may be periodically recalculated to account for the new words in the new email messages, so that subsequent email messages may be accurately classified as legitimate or unsolicited.

The invention contemplates capturing structural associations between words. Hence, two words whose representations are "close" (in some suitable metric) tend to appear in the same kind of documents, whether or not they actually occur within identical word contexts in the documents. Each semantic anchor $\bar{v}_1$ and $\bar{v}_2$ may be viewed as the centroid of the words in the legitimate email messages, and in the unsolicited email messages respectively. This means that associated words such as synonyms occur in close proximity to other similar words in each category of the unsolicited and legitimate email messages in the semantic vector space S. For example, if a particular word is found more frequently in the unsolicited email messages as compared with legitimate email messages of the training corpus, an incoming email containing a synonym of the word will be closer to the unsolicited message category in semantic vector space S. Thus, email filtering system 100 properly classifies incoming email messages containing synonyms eliminating the need for frequent recalculations of semantic anchors $\bar{v}_1$ and $\bar{v}_2$.

After calculating the semantic anchors $\bar{v}_1$, $\bar{v}_2$, and the vector representation $\bar{v}_3$ of the new email message, a measure of closeness K is calculated. The measure of closeness K is a measure of how close a new email message is to a legitimate email message, or to an unsolicited email message. The measure of closeness K is computed by calculation unit 160 and, in one embodiment, compares the angle formed between vectors $\bar{v}_1$ and $\bar{v}_3$, with the angle formed between vectors $\bar{v}_2$ and $\bar{v}_3$. The measure of closeness K may be calculated using:

$$K(\bar{v}_3, \bar{v}_j) = \cos(v_3 S, v_j S) = \frac{v_3 S^2 v_j^T}{\|v_3 S\| \|v_j S\|} \qquad (7)$$

for j=1, 2. Other methods may be employed to calculate the measure of closeness K including, but not limited to, calculating the length of the normals between vectors $\bar{v}_1$, $\bar{v}_2$, and $\bar{v}_3$.

After calculating the measure of closeness K, logic unit 165 determines whether the new email is unsolicited 170, legitimate 175, or ambiguous 180. In one embodiment, if $\bar{v}_3$ is closer to $\bar{v}_1$, i.e., the angle between $\bar{v}_3$ and $\bar{v}_1$ is smaller than the angle between $\bar{v}_3$ and $\bar{v}_2$, the new email is considered to be a legitimate email message 175, and email filtering system 100 may automatically permit the new email to be viewed by its intended recipient. Optionally, the email filtering system may allow the user to include the legitimate email message as part of the training email corpus $\mathcal{T}$. Alternately, if $\bar{v}_3$ is closer to $\bar{v}_2$, i.e., the angle between $\bar{v}_3$ and $\bar{v}_1$ is greater than the angle between $\bar{v}_3$ and $\bar{v}_2$, the new email is considered unsolicited 170. In one embodiment, unsolicited email messages may be automatically discarded by the email filter system. Alternate embodiments may maintain a copy of the unsolicited email so that a user may, at the user's convenience, discard the unsolicited mail or include it to form part of the training email corpus $\mathcal{T}$.

If the angle between $\bar{v}_3$ and $\bar{v}_1$ is approximately equal to the angle between $\bar{v}_3$ and $\bar{v}_2$, logic unit 165 may tag the email message as ambiguous 180, for example, with an icon to indicate an ambiguous email message. Alternate embodiments may tag each incoming email message with a unique tag for each of the unsolicited, legitimate, and ambiguous categories, allowing for ease in sorting and handling of the received email messages. With respect to ambiguous email messages, in one embodiment, a user may determine whether the email message is legitimate or unsolicited. Alternate embodiments may permit a user to discard the ambiguous email message, or include it, after removing the ambiguity, to form part of the training email corpus $\mathcal{T}$, so that the ambiguity associated with future similar messages may be automatically handled by email filtering system 100.

As an example consider the following email messages received by a person in the fishing business: (a) Fishing is excellent in the south bank of the river, and (b) The Merchant bank has high interest rates. Although both email messages have the word 'bank' in the text of the message, the method described will properly classify message (a) as a legitimate email message and message (b) as an unsolicited email message.

The email training corpus $\mathcal{T}$ is developed using existing email messages of the user in the fishing business. After the email training corpus $\mathcal{T}$ is generated by email training unit 105, co-occurrences unit 110 generates matrix W using the email training corpus $\mathcal{T}$. SVD unit 115 decomposes matrix W and obtains semantic anchors $\bar{v}_1$ and $\bar{v}_2$. When the two email messages are received by the user in the fishing business, they are each converted to a vector $\bar{v}_3$ using equation 6 above. In one embodiment, for each email message the measure of closeness K between $\bar{v}_1$ and $\bar{v}_3$, and between $\bar{v}_2$ and $\bar{v}_3$ is calculated using equation 7. For legitimate email message (a), the measure of closeness K indicates that $\bar{v}_3$ is closer to $\bar{v}_1$ as compared with $\bar{v}_2$ thereby indicating the message is legitimate. However, for unsolicited message (b) the measure of closeness K will indicate that vector $\bar{v}_3$ is closer to unsolicited vector $\bar{v}_2$ as compared with $\bar{v}_1$ indicating that the message is unsolicited. Thus despite the same word 'bank' being present in each of the two email messages, the context in which they appear is taken into account in determining whether the received email message is legitimate or unsolicited.

Figure 3:
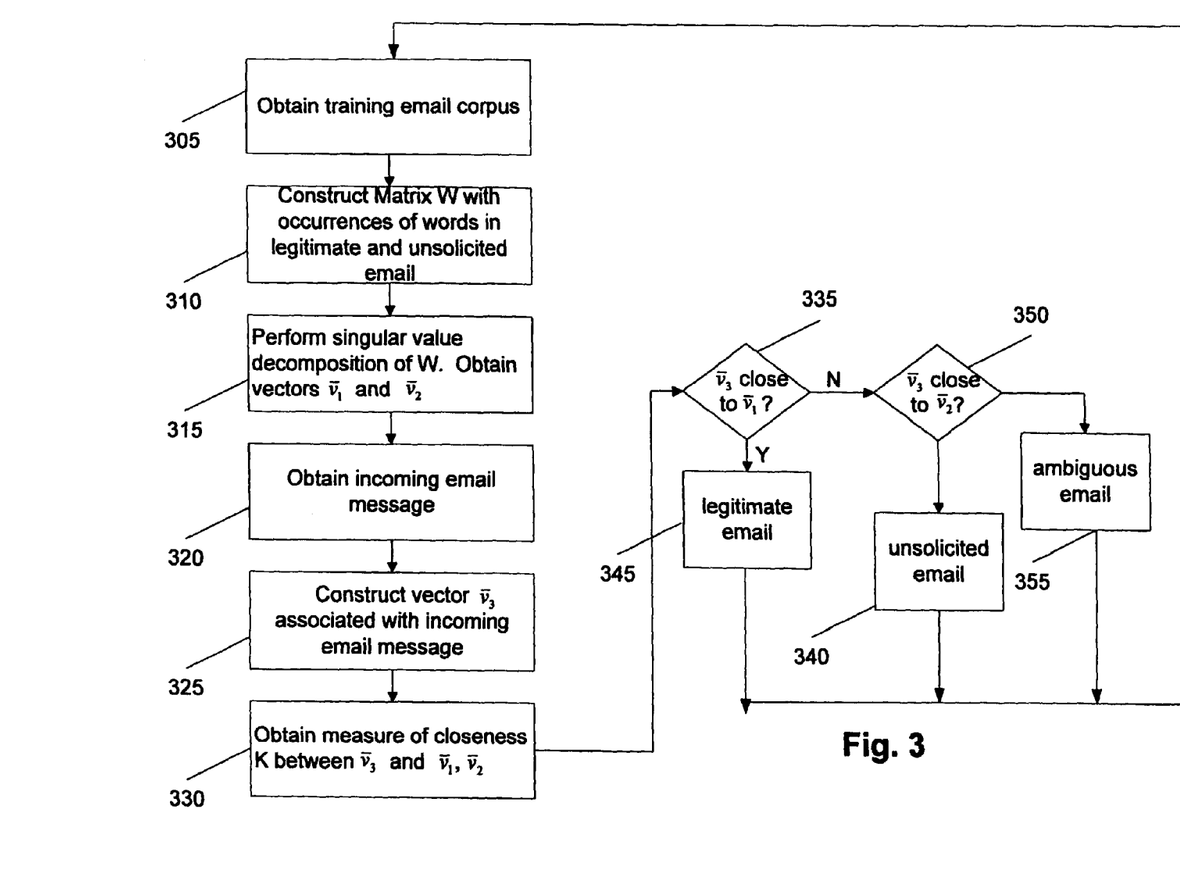
FIG. 3 is a flowchart illustrating a method used in filtering email according to one embodiment of the present invention.

FIG. 3 illustrates a method that may be used to filter email according to one embodiment of the invention. At 305 the email training corpus $\mathcal{T}$ is accessed, and at 310 the email messages in the training email corpus $\mathcal{T}$ are used to construct matrix W (described earlier) that essentially keeps track of which word is found in what document. In particular, matrix W maintains a record of the number of times each word appears in each legitimate and each unsolicited email message. In one embodiment, equation (1) is used to construct matrix W. After constructing matrix W, at 315 a SVD is performed using equation (3) and semantic anchors $\bar{v}_1$, and $\bar{v}_2$ are obtained using equations (4) and (5).

At 320, an incoming email message is received, and at 325, vector $\bar{v}_3$ is constructed from the incoming email message using equation (6). At 330, a measure of closeness K is obtained using equation (7). As explained above, the measure of closeness determines whether the new email message is legitimate, unsolicited or ambiguous.

At 335, a determination is made whether the new email message is legitimate. If the angle between $\bar{v}_3$ and $\bar{v}_1$ is smaller than the angle between $\bar{v}_3$ and $\bar{v}_2$, at 345, the new email message is classified as legitimate. In one embodiment, legitimate email messages may be forwarded to the intended recipient.

At 350 a determination is made whether the new email message is unsolicited. If the angle between $\bar{v}_3$ and $\bar{v}_1$ is larger than the angle between $\bar{v}_3$ and $\bar{v}_2$, at 340, the new email message is classified as unsolicited. In one embodiment, the new email message that is classified as unsolicited may be automatically discarded. Alternate embodiments may provide for the newly classified legitimate and unsolicited messages to form part of the email training corpus $\mathcal{T}$.

However, if the angle between $\bar{v}_3$ and $\bar{v}_1$ is approximately equal to the angle between $\bar{v}_3$ and $\bar{v}_2$, at 355 the email message may be classified as ambiguous. In one embodiment, ambiguous email messages are forwarded to the intended recipient of the email message to eliminate the ambiguity and to classify the email message as legitimate or unsolicited. In one embodiment, after a recipient classifies the email message, the email message is included in the email training corpus, and new semantic anchors are calculated. Thus, the next time an email message with content similar to the ambiguous email message is received, the email filtering system automatically classifies the email as legitimate or unsolicited.

Embodiments of the email filtering system may be employed individually on a machine for a particular user or on a central machine, e.g., an email server, to filter out email messages for a group of email recipients. Alternate embodiments may include employing the email filtering system on a server or other device that communicates with a remote user, for example, a user using a wireless device such as a wireless personal digital assistant (PDA) or wireless palm top computer, so that the limited memory of the wireless device is not unnecessarily filled with unsolicited email messages. Alternate embodiments may employ the email filtering system on the PDA and unsolicited messages may be discarded as soon as they are received.

Figure 4:
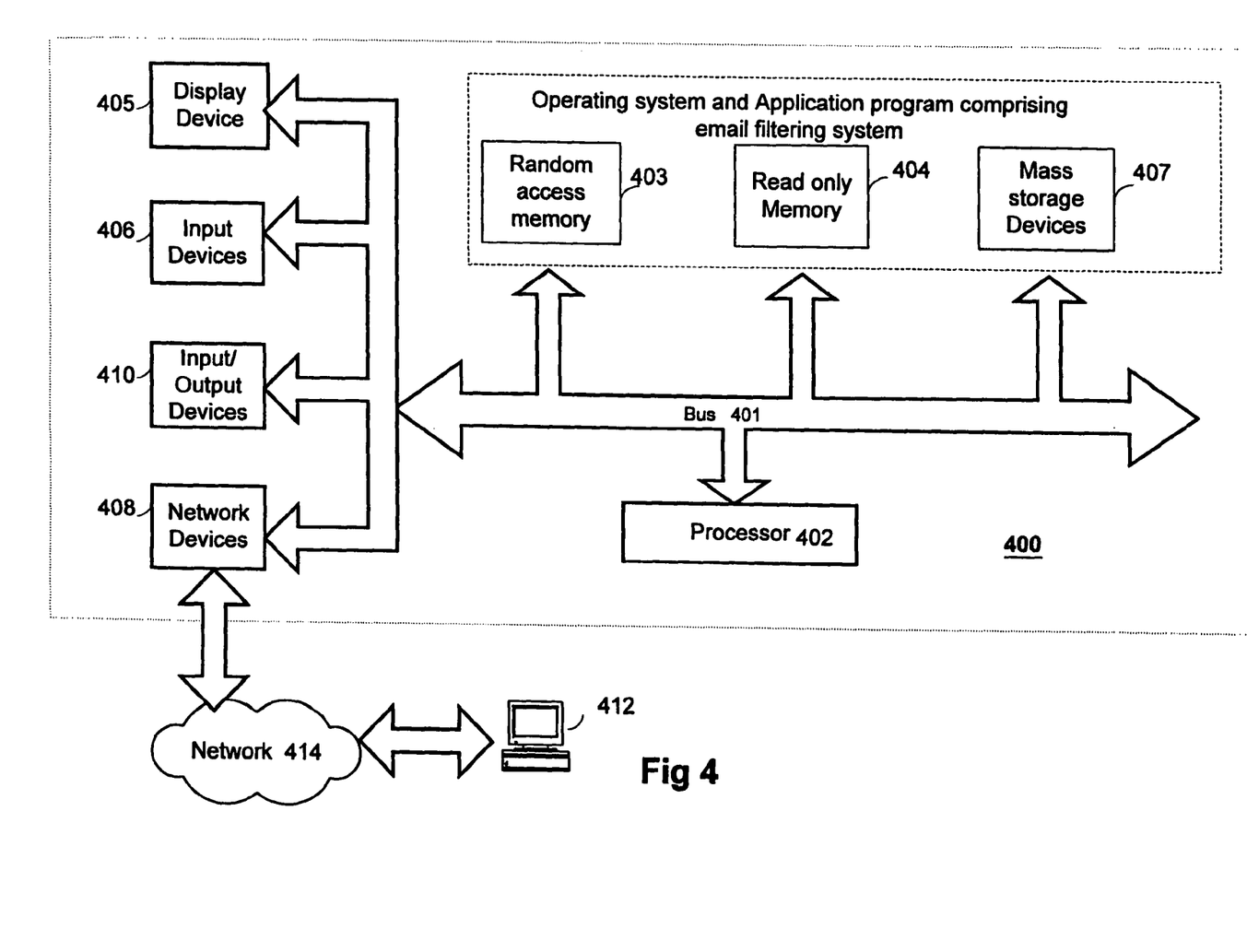
FIG. 4 illustrates a block diagram of a computing device for use with one embodiment the present invention.

FIG. 4 illustrates one embodiment of an apparatus that may be used to filter email messages. Although the embodiment described uses a personal computer, other devices including wireless devices such as cellular phones and personal digital assistants may also be used. One embodiment of the present invention may be implemented on a personal computer (PC) architecture. It will be apparent to those of ordinary skill in the art that alternative computer system architectures or other processor, programmable or electronic-based devices may also be employed.

In general, such computer systems as illustrated by FIG. 4 include a processor 402 coupled through a bus 401 to a random access memory (RAM) 403, a read only memory (ROM) 404, and a mass storage device 407. Mass storage device 407 represents a persistent data storage device, such as a floppy disk drive, fixed disk drive (e.g., magnetic, optical, magneto-optical, or the like), or streaming tape drive. Processor 402 may be any of a wide variety of general purpose processors or microprocessors (such as the Pentium® processor manufactured by Intel® Corporation), a special purpose processor, or a specifically programmed logic device.

Display device 405 is coupled to processor 402 through bus 401 and provides graphical output for computer system 400. Input devices 406 such as a keyboard or mouse are coupled to bus 401 for communicating information and command selections to processor 402. Also coupled to processor 402 through bus 401 is an input/output interface 410 which can be used to control and transfer data to electronic devices (printers, other computers, etc.) connected to computer system 400. Computer system 400 includes network devices 408 for connecting computer system 400 to a network 414 through which email messages may be received, e.g., from remote device 412. Network devices 408, may include Ethernet devices, phone jacks and satellite links. It will be apparent to one of ordinary skill in the art that other network devices may also be utilized.

One embodiment of the invention may be stored entirely as a software product on mass storage 407. Another embodiment of the invention may be embedded in a hardware product, for example, in a printed circuit board, in a special purpose processor, or in a specifically programmed logic device communicatively coupled to bus 401. Still other embodiments of the invention may be implemented partially as a software product and partially as a hardware product.

Figure 5:
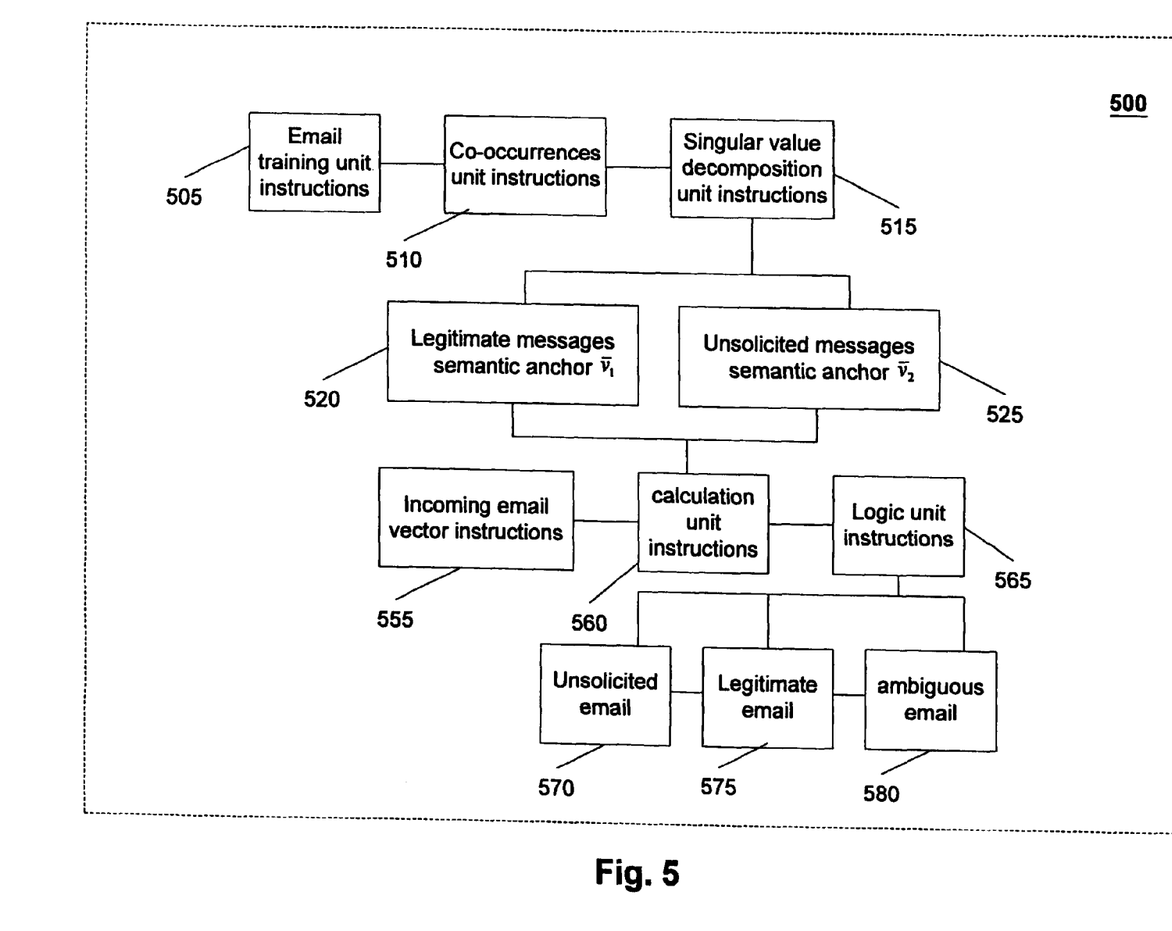
FIG. 5 illustrates a block diagram of one embodiment of the invention stored on a machine-accessible medium.

Embodiments of the invention may be represented as a software product stored on a machine-accessible medium (also referred to as a computer-accessible medium or a processor-accessible medium) as illustrated in FIG. 5. The machine-accessible medium may be any type of magnetic, optical, or electrical storage medium including a diskette, CD-ROM, memory device (volatile or non-volatile), or similar storage mechanism. The machine-accessible medium may contain various sets of instructions, code sequences, configuration information, or other data. Those of ordinary skill in the art will appreciate that other instructions and operations necessary to implement the described invention may also be stored on the machine-accessible medium. FIG. 5 illustrates a machine-accessible medium that includes instructions that when executed by a machine causes the machine to perform operations comprising determining a first semantic anchor 520 corresponding with a first group of messages, for example, legitimate email messages. Determining a second semantic anchor 525 corresponding with a second group of messages, for example, unsolicited email messages. The first and the second semantic anchors are determined as described earlier using instructions that implement the email training unit 505, instructions that implement the co-occurrences unit 510 and instructions that implement the singular value decomposition unit 515. The machine-accessible medium includes further instructions for determining a vector corresponding with an incoming message and instructions for comparing the vector with at least one of the first semantic anchor 520 and the second semantic anchor 525 to obtain at least one comparison value. The vector corresponding with an incoming message is determined using instructions to implement the email conversion unit 555. The instructions for comparing the vector 555 with at least one of the first semantic anchor 520 and the second semantic anchor 525 to obtain at least one comparison value comprise instructions that implement the calculation unit 560. The machine-accessible medium includes further instructions to filter the incoming message based on the comparison value. The instructions to filter the incoming message based on the comparison value, comprises instructions for implementing logic unit 565. In particular, the instructions to filter the incoming message comprises instructions to determine whether the incoming message is unsolicited email 570, legitimate email 575, or ambiguous email 580.

Experiments conducted using one embodiment of the method and apparatus of the present invention revealed that for a database comprising one legitimate email message $N_1$ and one unsolicited email message $N_2$ in the training corpus $\mathcal{T}$ the email filtering system performed reasonably well. An exponential increase in the performance of the email filtering system occurred as the values of $N_1$ and $N_2$ approached 50. Subsequent increases in the values of $N_1$ and $N_2$ revealed a relative plateau in the performance of the email filtering system. In one embodiment, more than 95% of a user's incoming email messages were properly classified, with approximately less than 3% of the user's email messages being passed to the user for disambiguation. A significantly lower misclassification rate was observed as compared with the misclassification rate of prior art methods.

While there has been illustrated and described what are presently considered to be example embodiments of the present invention, it will be understood by those skilled in the art that various other modifications may be made, and equivalents may be substituted, without departing from the true scope of the invention. Additionally, many modifications may be made to adapt a particular situation to the teachings of the present invention without departing from the central inventive concept described herein. Therefore, it is intended that the present invention not be limited to the particular embodiments disclosed, but that the invention include all embodiments falling within the scope of the appended claims.

What is claimed is:

1. A method for filtering messages with a data processing system having a processor and memory, the method comprising:

storing in the memory a first semantic representation corresponding to a first group of messages and a second semantic representation corresponding to a second group of messages using at least one matrix stored in the memory, wherein the first group of messages are defined as legitimate messages and the second group of messages are defined as unsolicited messages;

determining a mathematical representation corresponding to an incoming message;

comparing the mathematical representation corresponding to the incoming message with at least one of the first semantic representation and the second semantic representation to obtain at least one of a first comparison value and a second comparison value;

designating the incoming message as ambiguous through classifying the incoming message between the first and second groups based on at least one of the first comparison value and the second comparison value; and prompting a user to determine whether the ambiguous message is legitimate or unsolicited in response to the designating, wherein the user is permitted to discard the ambiguous message, and wherein the message is included into a training email corpus in response to the user's determination, and wherein the first semantic representation and the second representation are calculated using latent semantic analysis.

2. A method as in claim 1, wherein the method further comprises receiving an input to perform one of: (a) discarding the incoming message designated as ambiguous or (b) including the incoming message as part of a training message corpus.

3. A method as in claim 2, wherein the second semantic representation and the first semantic representation are mathematical vectors obtained respectively from previously received unsolicited messages of a training message corpus and previously received messages defined not to be unsolicited messages of the training message corpus.

4. A method as in claim 3, wherein the training message corpus is used to obtain a matrix W comprising a word distribution factor.

5. A method as in claim 4, wherein the matrix W is used to generate the first semantic representation and the second semantic representation using singular value decomposition.

6. A method as in claim 1, wherein the first group of messages, the second group of messages and the incoming message comprise messages from at least one of email messages, email attachments, and computer programs.

7. A method as in claim 1, wherein determining a mathematical representation corresponding to an incoming message comprises using singular value decomposition to generate the mathematical representation corresponding to the incoming message.

8. A method as in claim 1, wherein comparing the mathematical representation corresponding to the incoming message with at least one of the first semantic representation and the second semantic representation comprises determining an angle between the mathematical representation corresponding to the incoming message and at least one of the first semantic representation and the second semantic representation.

9. A method as in claim 1, wherein comparing the mathematical representation corresponding to the incoming message with at least one of the first semantic representation and the second semantic representation comprises comparing the length of a normal between the first semantic representation and the mathematical representation corresponding to the incoming message, and the length of a normal between the second semantic representation and the mathematical representation corresponding to the incoming message.

10. A method as in claim 1, wherein comparing the mathematical representation corresponding to the incoming message with at least one of the first semantic representation and the second semantic representation to obtain a first comparison value and a second comparison value comprises permitting a user to decide whether the incoming message is from the first group of messages or from the second group of messages when the first comparison value is substantially equal to the second comparison value.

11. A method as in claim 10, wherein designating the incoming message based on the first comparison value and the second comparison value comprises at least one of automatically filtering the incoming messages, and tagging the incoming message.

12. A method as in claim 11, wherein tagging the incoming message comprises at least one of tagging the incoming message with a first tag for a message corresponding with the first group of messages, tagging the incoming message with a second tag for a message corresponding with the second group of messages, and tagging the incoming message with a third tag when the first comparison value is substantially equal to the second comparison value.

13. An article of manufacture comprising:
a machine-accessible medium including instructions that, when executed by a machine, causes the machine to perform operations comprising:
storing a first semantic representation corresponding to a first group of messages and a second semantic representation corresponding to a second group of messages using at least one matrix, wherein the first group of messages are defined as legitimate messages and the second group of messages are defined as unsolicited messages;
determining a mathematical representation corresponding to an incoming message;
comparing the mathematical representation corresponding to the incoming message with at least one of the first semantic representation and the second semantic representation to obtain at least one of a first comparison value and a second comparison value;
designating the incoming message as ambiguous through classifying the incoming message between the first and second groups based on at least one of the first comparison value and the second comparison value; and prompting a user to determine whether the ambiguous message is legitimate or unsolicited in response to the designating, wherein the user is permitted to discard the ambiguous message, and wherein the message is included into a training email corpus in response to the user's determination, and wherein the first semantic representation and the second representation are calculated using latent semantic analysis.

14. An article of manufacture as in claim 13, wherein the method further comprises receiving an input to perform one of: (a) discarding the incoming message designated as ambiguous or (b) including the incoming message as part of a training message corpus.

15. An article of manufacture as in claim 14, wherein said instructions for obtaining the second semantic representation and the first semantic representation include further instructions for obtaining mathematical vectors respectively from previously received unsolicited messages of a training message corpus and previously received messages defined not to be unsolicited messages of the training message corpus.

16. An article of manufacture as in claim 15, wherein said instructions for obtaining vectors using a training message corpus comprises further instructions for obtaining a matrix W comprising a word distribution factor.

17. An article of manufacture as in claim 16, wherein said instructions for obtaining matrix W comprises further instructions for generating the first semantic representation and the second semantic representation using singular value decomposition.

18. An article of manufacture as in claim 13, wherein said first group of messages, said second group of messages and said incoming message comprise messages from at least one of email messages, email attachments, and computer programs.

19. An article of manufacture as in claim 13, wherein said instructions for determining a mathematical representation corresponding to an incoming message comprises further instruction for using singular value decomposition to generate the mathematical representation corresponding to the incoming message.

20. An article of manufacture as in claim 13, wherein said instructions for comparing the mathematical representation corresponding to the incoming message with at least one of the first semantic representation and the second semantic representation comprises further instructions for determining an angle between the mathematical representation corresponding to the incoming message and at least one of the first semantic representation and the second semantic representation.

21. An article of manufacture as in claim 13, wherein said instructions for comparing the mathematical representation corresponding to the incoming message with at least one of the first semantic representation and the second semantic representation comprises further instructions for comparing the length of a normal between the first semantic representation and the mathematical representation corresponding to the incoming message, and the length of a normal between the second semantic representation and the mathematical representation corresponding to the incoming message.

22. An article of manufacture as in claim 13, wherein said instructions for comparing the mathematical representation corresponding to the incoming message with at least one of the first semantic representation and the second semantic representation to obtain a first comparison value and a second comparison value comprises further instructions for permitting a user to decide whether the incoming message is from the first group of messages or from the second group of messages when the first comparison value is substantially equal to the second comparison value.

23. An article of manufacture as in claim 22, wherein said instructions for designating the incoming message based on the first comparison value and the second comparison value comprises further instructions for at least one of automatically filtering the incoming messages, and tagging the incoming message.

24. An article of manufacture as in claim 23, wherein said instructions for tagging the incoming message comprises further instructions for at least one of, tagging the incoming message with a first tag for a message corresponding with the first group of messages, tagging the incoming message with a second tag for a message corresponding with the second group of messages, and tagging the incoming message with a third tag when the first comparison value is substantially equal to the second comparison value.

25. A computer system comprising:
a bus;
a data storage device coupled to said bus;
a processor coupled to said data storage device;
a singular value decomposition unit communicatively coupled to the processor; and wherein the data storage device stores a first semantic representation corresponding to a first group of messages and a second semantic representation corresponding to a second group of messages using at least one matrix, wherein the first group of messages are defined as legitimate messages and the second group of messages are defined as unsolicited messages;
an incoming email conversion unit communicatively coupled to the singular value decomposition unit to determine a mathematical representation corresponding to an incoming message;
a logic unit communicatively coupled to the incoming email conversion unit and the singular value decomposition unit to compare the mathematical representation corresponding to the incoming message with at least one of the first semantic representation and the second semantic representation to obtain at least one of a first comparison value and a second comparison value, and to designate the incoming message as ambiguous through classifying the incoming message between the first and second groups based on at least one of the first comparison value and the second comparison value, and wherein the logic unit is configured to prompt a user to determine whether the ambiguous message is legitimate or unsolicited in response to the designating, wherein the user is permitted to discard the ambiguous message, and wherein the message is included into a training email corpus in response to the user's determination, and wherein the first semantic representation and the second representation are calculated using latent semantic analysis.

26. A computer system as in claim 25, wherein the second semantic representation and the first semantic representation are vectors obtained respectively from previously received unsolicited messages of a training message corpus and previously received messages defined not to be unsolicited messages of the training message corpus.

27. A computer system as in claim 26, wherein the training message corpus is used to obtain a matrix W comprising a word distribution factor.

28. A computer system as in claim 27, wherein the matrix W is used to generate the first semantic representation and the second semantic representation using singular value decomposition.

29. A computer system as in claim 25, wherein the first group of messages, the second group of messages and the incoming message comprise messages from at least one of email messages, email attachments, transcribed audio messages, and computer programs.

30. A computer system as in claim 25, wherein an incoming email conversion unit communicatively coupled to the singular value decomposition unit to determine a mathematical representation corresponding to an incoming message comprises the incoming email conversion unit using singular value decomposition to generate the mathematical representation corresponding to the incoming message.

31. A computer system as in claim 25, wherein the logic unit communicatively coupled to the incoming email conversion unit and the singular value decomposition unit to compare the mathematical representation corresponding to the incoming message with at least one of the first semantic representation and the second semantic representation to obtain a first comparison value and a second comparison value comprises the logic unit to determine an angle between the mathematical representation corresponding to the incoming message and at least one of the first semantic representation and the second semantic representation.

32. A computer system as in claim 25, wherein the logic unit communicatively coupled to the incoming email conversion unit and the singular value decomposition unit to compare the mathematical representation corresponding to the incoming message with at least one of the first semantic representation and the second semantic representation to obtain a first comparison value and a second comparison value comprises the logic unit to compare the length of a normal between the first semantic representation and the mathematical representation corresponding to the incoming message, and the length of a normal between the second semantic representation and the mathematical representation corresponding to the incoming message.

33. A computer system as in claim 25, wherein the logic unit communicatively coupled to the incoming email conversion unit and the singular value decomposition unit to compare the mathematical representation corresponding to the incoming message with at least one of the first semantic representation and the second semantic representation to obtain a first comparison value and a second comparison value comprises the logic unit to permit a user to decide whether the incoming message is from the first group of messages or from the second group of messages when the first comparison value is substantially equal to the second comparison value.

34. A computer system as in claim 33, wherein the logic unit to designate the incoming message based on the first comparison value and the second comparison value comprises the logic unit to at least one of automatically filter the incoming messages, and to tag the incoming message.

35. A computer system as in claim 34, wherein the logic unit to tag the incoming message comprises at least one of the logic unit to tag the incoming message with a first tag for a message corresponding with the first group of messages, the logic unit to tag the incoming message with a second tag for a message corresponding with the second group of messages, and the logic unit to tag the incoming message with a third tag when the first comparison value is substantially equal to the second comparison value.

* * * * *

UNITED STATES PATENT AND TRADEMARK OFFICE
CERTIFICATE OF CORRECTION

| | | |
|---|---|---|
| PATENT NO. | : 7,856,479 B2 | Page 1 of 1 |
| APPLICATION NO. | : 11/643304 | |
| DATED | : December 21, 2010 | |
| INVENTOR(S) | : Jerome R. Bellegarda et al. | |

It is certified that error appears in the above-identified patent and that said Letters Patent is hereby corrected as shown below:

On page 2, in column 1, under "Other Publications", line 1, delete "Montly" and insert -- Monthly --, therefor.

On page 2, in column 2, under "Other Publications", line 7, delete "Proceesing," and insert -- Processing, --, therefor.

On page 2, in column 2, under "Other Publications", line 50, delete "Internation" and insert -- International --, therefor.

In column 6, line 15, delete "feed back" and insert -- feedback --, therefor.

In column 7, line 60, delete " $\overline{v}_{i,j}$ " and insert -- $\overline{v}_i |$ --, therefor.

Signed and Sealed this
Twenty-fifth Day of October, 2011

David J. Kappos
*Director of the United States Patent and Trademark Office*